Dec. 14, 1965  W. K. SMITH  3,222,930
SPECTROPYROMETER APPARATUS AND METHOD
Filed Dec. 4, 1961  2 Sheets-Sheet 1

WARREN K. SMITH
INVENTOR.

BY
ATTORNEY

WARREN K. SMITH
INVENTOR.

United States Patent Office 3,222,930
Patented Dec. 14, 1965

3,222,930
SPECTROPYROMETER APPARATUS AND METHOD
Warren K. Smith, 100 Coral Sea Circle, China Lake, Calif.
Filed Dec. 4, 1961, Ser. No. 156,822
28 Claims. (Cl. 73—355)

This invention pertains to improvements in means and methods useful in measurement of temperature.

In those processes in which the measurement of high temperatures is characterized by the restriction that the sensor be spatially remote from the source of heat whose temperature is to be sensed and measured, radiant-energy-sensitive instruments of one or two types are generally used. Instruments of the first category utilize sensors sensitive to radiant energy of all wave lengths emanating from the source of heat. Those of the second category restrict the sensing of energy to a single wave length or to energy comprised in a narrow band of wave lengths. With the exception of the relatively new "two-color" pyrometer the mentioned types of instruments are inherently subject to uncertainties or possible errors due to the widely variable emittance characteristic of the surface of the heat source the temperature of which is to be measured. The spectropyrometer of the present invention is substantially immune to this variable factor, relatively free of influence by surface and, as will become apparent below, possesses inherent advantages over known two-color pyrometers.

The apparatus and method of this invention are based upon Wien's displacement law, that is, upon the fact that the wave length at any particular selected boundary of energy division (e.g., 50% energy division) in the spectrum of the energy radiated from a body, varies inversely as the absolute temperature of the body, and thus is related to the absolute temperature of the body in the same manner as is the peak intensity of the radiated spectrum. It is known as will be explained in detail presented, a body at any temperature above absolute zero (0° K.) radiates energy with an intensity which varies with wave length and which, at any particular temperature, increases from a low value at a short wave length to a maximum at an intermediate wave length and then decreases toward a second low value at a longer wave length. Thus, there is a "peak" or maximum in the graphical plot of intensity versus wave length as plotted for any selected temperature of the radiating object. The wave length representing maximum intensity shifts in the direction of shorter wave length as the source temperature increases. Thus in a family of characteristic intensity versus wave length curves, each curve corresponds to a particular respective temperature of the specific heat source, and each curve represents the spectral distribution of the radiant energy at that selected temperature of the radiating body.

Wien's displacement law states that for a blackbody any corresponding position on such a family of curves is related to absolute temperature T and wave length W by the equation: $WT=k$, wherein $k$ is a constant having a unique value for each such position.

The constant $k$ associated with the position of peak intensity of the radiated energy is equal to 2898 micron degrees Kelvin while that associated with the 50% energy division of the spectrum is equal to 4110 micron degrees Kelvin.

The total normal emittance of a surface is the ratio of the total energy emitted by the surface, to the total energy emitted by a perfect blackbody at the same temperature. The radiating power of a surface is described at its emittance. The term emissivity is reserved for the radiating power of an optically smooth surface, being thereby a fundamental property of a substance without influence of surface condition. A pyrometer of the hereinabove mentioned first category measures total energy emitted and must be calibrated in terms of a blackbody radiator, and hence the true temperature of a heat source can be ascertained only if the emittance of the source is known. In the second category of instruments, the radiation intensity of the source at one wave length is matched with the radiation energy from a standard source, the true temperature likewise being ascertainable only if the spectral emittance of the source is known.

A two-color pyrometer measures the radiation intensity at two wave lengths, and the instrument is calibrated in terms of the ratio of the two radiation intensities. And since for a graybody at any selected temperature the emissivity is the same at all wave lengths, the two-color instrument may be calibrated to give reasonably accurate results only as respects temperatures above that producing measurable intensities for the two visible color wave lengths or bands and that beyond which the peak of the curve would pass between the two color wave bands, namely temperatures above 1400° F.

As previously indicated, the present invention makes use of this fact from Wien's displacement law: that the wave length at which a particular selected division (such as 50%, or 40%) of the total energy radiated occurs, is related to the absolute temperature of the body in the same way as is the peak intensity of the radiation from the body. However, the constant $k'$ in this case has a different value, and is, for example equal to 4110 micron degree Kelvin for the 50% energy division. Using 50% division of energy for illustrative purposes and as the most convenient division with which to operate, the principle of the present invention will be briefly explained, it being understood that other divisions, such as 60%–40%, 55%–45%, etc., may be used, for reasons which will appear hereinafter.

In the practice of the present invention, the total radiation from the source is divided into two portions, one comprising all the shorter wave lengths and the other comprising all the remaining longer wave lengths. The division of the energy is accomplished by dispersing the energy into a spectrum and selecting, by means herein described, a line of the spectrum at which the emitted energy of the wave lengths higher than that of the division line is, for example, equal to the energy of the wave lengths lower than that of the division line. The selection of the dividing line in the spectrum is effected by measuring first and second fractional parts of the total dispersed energy by first and second total-energy sensors arranged so as to intercept all of the energy of the exhibited spectrum and adjusting the position of the two sensors so that each intercepts one-half of the energy, for example. Preferably but not necessarily, the division of energy is on a 50%–50% basis in the interests of simplicity. The division may in fact be effected by any of several suitable means, but in a preferred exemplary type of apparatus the radiant energy is dispersed by adjustable optical means comprising prism means and mirror means, the total energy being sensed by two bolometer total energy sensor devices each arranged to receive a respective share of the radiation. By connecting the sensors in an electrical bridge network, and by constructing the optical means so that the division of the radiant energy in the spectrum between the two sensors may be adjusted, the desired division ratio may be readily achieved. Concurrently, an indicator connected to the optical system is utilized to register the temperature of the radiating body. Preferably, adjustment of the twin sensors relative to the spectrally divided beam of radiant energy emanating from the heat source occurs automatically by utilization of servosystem techniques. The adjustment of the positions of the two sensors to a position of balance whereat each sensor receives or intercepts its predetermined share of the total energy, 50% for example, in the case of equal division, is effected by movable means operated by a servosystem including a balancing network such as a bridge network in which the sensors are connected. The movable means is moved concurrently with an indicator that serves to indicate the balance point, and the latter, as indicated upon a suitably demarked scale, indicates the absolute temperature. At the balance point where each sensor receives the determined percentage of the energy dispersed in the spectrum, the spectral line whereat the division occurs divides the energy into a higher wavelength fraction that is absorbed by one sensor and a lower wave length fraction that is absorbed by the other sensor. The spectral line at which division occurs falls upon the very narrow gap separating the juxtaposed sensors. The two fractions, whether 50%–50%, or 40%–60%, or according to any other selected ratio, include 100% of the energy in the spectrum. As is evident, since the wave length at which the division occurs when the network is balanced varies inversely as the absolute temperature, the position of the narrow gap between the sensors, or the position of any servomechanism part moving with the sensors, may serve as an indicator to move relative to the scale to indicate the absolute temperature of the source being observed. These features and characteristics of a preferred embodiment of the invention as well as less expensive variants thereof will be explained in detail below.

From the foregoing brief description of the inventive concept it will be recognized that a principal object of the invention is to provide improvements in means for indicating the temperature of a body.

Another object of the invention is to provide improvements in pyrometry.

An additonal object of the invention is to provide pyrometric measurement methods and apparatus unaffected by the emittance of the heat source undergoing measurement.

Another object of the invention is to rovide pyrometric means utilizing the total radiant energy emitted from a subject source and two sensors each receptive of a respective fraction of the total radiant energy and to utilize these in a manner to provide speedy, reliable and accurate, true temperature measurements.

These and other more specific objects will appear upon reading the following specifications and claims and upon considering in connection therewith the attached drawings to which they relate.

Referring now to the drawings in which a preferred embodiment of the invention is illustrated.

Figure 4:
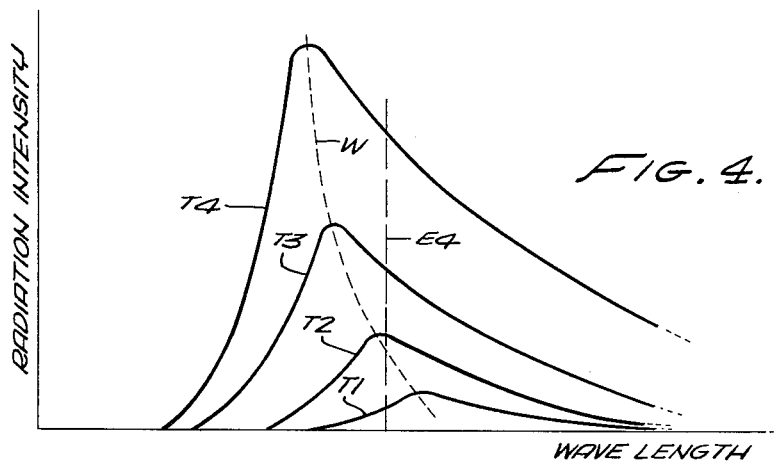
FIGURE 4 is a graphical representation useful in explaining the invention.

Referring to FIGURE 4, there is shown a series of graphical curves T1, T2, T3, and T4 produced from intensity and wave length values measured with a radiant body maintained at respective absolute temperatures $t1$, $t2$, $t3$ and $t4$ and increasing in that order. As may be observed from these graphs, the intensity at any selected temperature reaches a maximum at a specific wave length. And as previously stated, the wave length at which maximum intensity occurs decreases as the object temperature increases, as is indicated by dotted line W, connecting the several points of maximum intensity. The total energy radiated by the body per unit of time at any temperature may be represented by the area beneath the curve corresponding to that temperature. A vertical line dividing that area into equal sizes, as line E4 for curve T4, demarks by its intersection with the wave length axis a wave length which is related to the absolute temperature of the radiating body, in the same manner as is the maximum intensity of radiation at that temperature. This is equally true respecting any other similar vertical line dividing the total area or energy according to a different ratio, such as 75%/25%, or 40%/60%.

It will therefore be understood that a device which, arranged to move to a position corresponding to the wave length position denoted by line E4 for a body having a temperature $t4$, under the influence of means which causes an equal division of the total radiant energy between two discrete sensors, and which by the same action proceeds to a different corresponding position in response to temperature changes will, by its position relative to a base mark, indicate the absolute temperature of the body.

The apparatus presently described and explained effects at division of the radiated energy in the sensor system according to a selected ratio (50%/50% in the exemplary apparatus), and in so doing positions an indicator along a temperature scale thereby providing direct visible indication of the body's absolute temperature.

Figure 1:
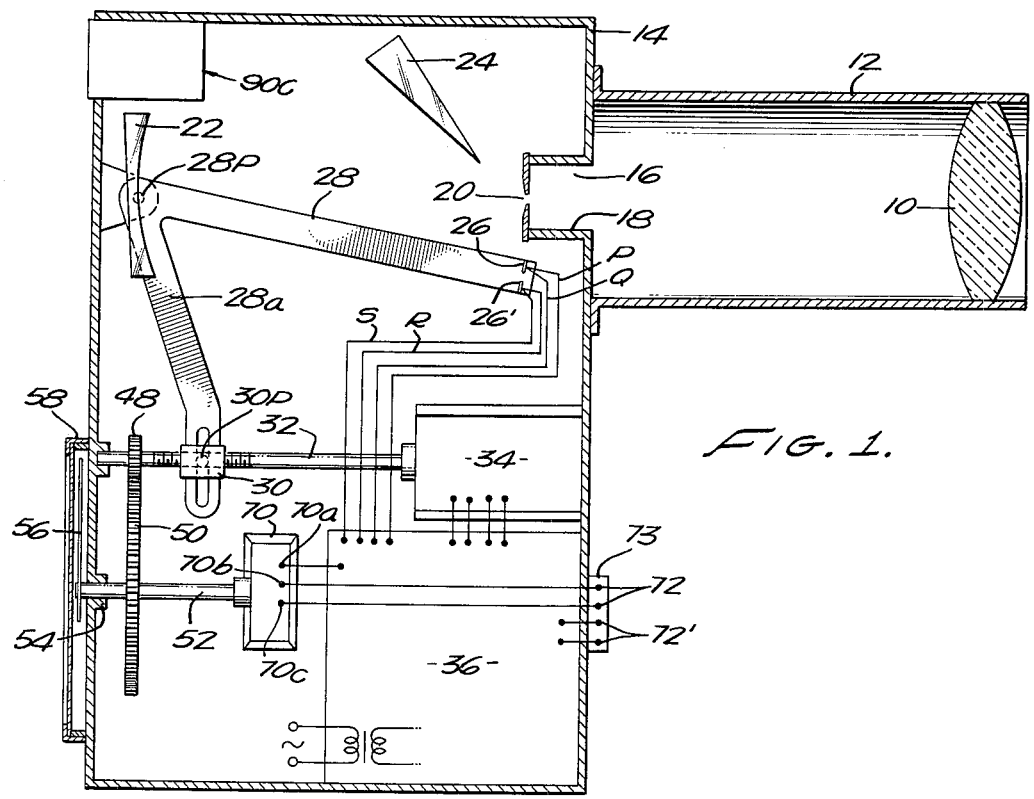
FIGURE 1 is a partly diagrammatic representation of optical, mechanical, and electrical components of a preferred embodiment of the pyrometric system of this invention.

Referring next to FIGURE 1, radiation from the body whose temperature is of interest passes through an objective lens 10 mounted in a readily removable optical barrel 12. Objective 10 may be of quartz, sapphire, arsenic trisulphide, or other special material known in the optical arts and selected according to the type of radiative sources to be served. Barrel 12 is attached by a suitable fitting to a preferably light-tight housing 14 constructed to support and protect apparatus components presently to be described.

Housing 14 has an optical window 16 framed by an entry tube 18 arranged to pass the condensed radiation entering through lens 10. The inner end of tube 18 supports means provided with an optical slit 20. Radiation from the source enters lens 10 passes through slit 20 and impinges on a concave mirror 22 and is reflected into a Littrow-mounted diffraction prism 24 suitably supported in housing 14.

Radiation entering prism 24 is diffracted and reflected by the rear surface of the prism and again diffracted upon exit. The doubly diffracted radiation existing from the prism passes back to mirror 22 and its dispersed spectral components are reflected in a somewhat condensed beam onto the surfaces of twin bolometer units 26, 26'.

Bolometer units 26, 26' preferably each comprise a thermopile or a thermistor attached to a small (e.g., one cm. square) blackened foil, the foils of the two units being arranged to intercept all of the radiation, the two units being in close proximity for this purpose. Desirably, bolometers 26, 26' are very slightly offset in overlapping relation to insure interception of the entire spectrum of radiation reflected by mirror 22. The detectors comprising bolometer units 26, 26' are all fixedly mounted on a bell crank 28 supported at its elbow on a pivot 28p suitably supported in bearings (not shown) mounted in housing 14.

The mechanical arrangement of the described parts is such that slight rotation of the bell crank suffices to divide the total radiation precisely in any desired ratio between the two bolometer units with one receiving the shorter wave lengths (higher frequencies) portion of the spectrum and the other receiving the remainder or longer wave lengths. As will be presently explained, automatic servo means operate to adjust the bell crank in a manner dividing radiation between the two bolometer units according to a predetermined desired ratio.

Arm 28a of bell crank 28 is slotted for reception of a driving pin 30p projecting from a driving nut 30 threadedly supported on leadscrew 32. Arm 28a may be bifurcated if desired, for balanced operation and leadscrew 32 will be understood as mounted in bearings and driven either by hand or preferably by a conventional servomotor 34 fixedly mounted in housing 14. If driven by hand, it will be understood that a null indicator must be arranged for visual indication of balance and can be energized by the four output terminals employed to drive servomotor 34. As is evident, rotation of leadscrew 32 by motor 34 causes traverse of nut 30 along the leadscrew to rock bell crank 28. Servomotor 34 is energized by properly phased power for rotation in either direction, selectively, by electrical means designated generally 36 in FIGURE 1. Bolometer detectors 26 and 26' are also connected by conductors P, Q, R and S to means 36 and the latter are supplied with A.C. power from any suitable commercial source.

Figure 2:
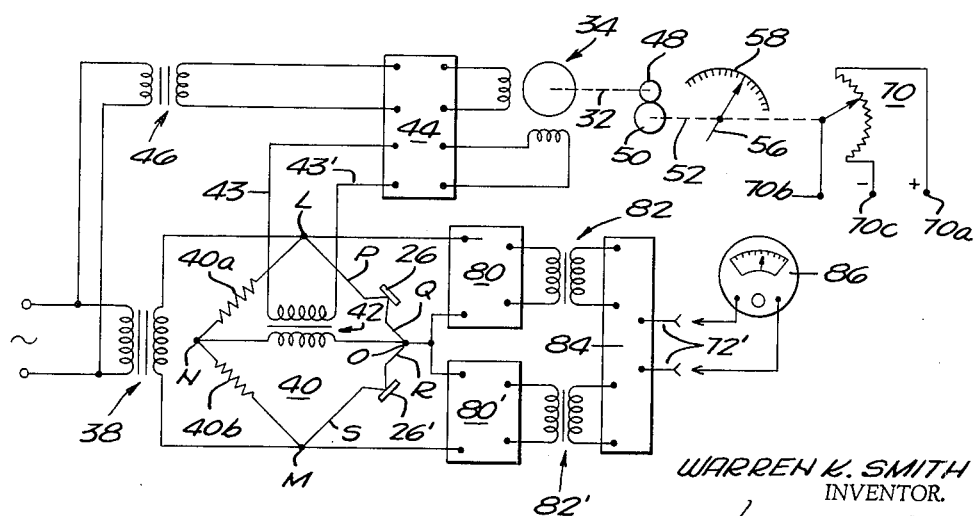
FIGURE 2 is a schematic diagram depicting connections of the electrical components of the apparatus represented in FIGURE 1.

In the preferred embodiment of electrical apparatus, A.C. circuitry is employed for the sake of convenience; however it will be understood that it is also within the scope of the invention to employ direct current components. As is indicated in FIGURE 2, alternating current power is supplied in any suitable manner to the primary of a transformer 38. The secondary of the transformer is connected to junctions L and M of a bridge circuit 40 whose limbs comprise equal value resistors 40a, 40b, and matched thermistor bolometer units 26, 26', connected respectively to junctions N and O. The primary of a bridge output transformer 42 is connected across junctions N and O with the result that the phase and amplitude of the output of transformer 42 indicates the sense and relative extent or magnitude of unbalance of the radiant energies sensed by bolometers 26, 26'.

It will be evident that this output is nil when equal amounts of radiation impinge on the two bolometers. The output of transformer 42 controls the operation of servomotor 34 in a way to cause movement of the bell crank 28 and bolometer units 26 and 26' to a position such that the energy division between the two units is equal. For example, should more than half of the sensed radiant energy impinge on unit 26, current flows through the primary of transformer 42, and a characteristic secondary potential is induced in the secondary to energize a servoamplifier 44 via leads 43, 43'. The servoamplifier is provided with neutral-phase A.C. power from a suitable source, such as an auxiliary transformer 46. Servoamplifier 44 is of any suitable conventional type, and has its two-phase output connected to energize servomotor 34 in the usual manner. Servomotor 34 is coupled directly to leadscrew 32 (FIGURE 1) and is responsive to unbalance of bridge circuit 40 to move nut 30 and bell crank 28 in a sense to equalize the radiant energy impinging on the respective bolometer units.

From the foregoing, it will be recognized that when balance of the bridge is achieved the position of the bell crank constitutes an indication of the division point in the spectrum at which the energy impinging on the bolometers is exactly equal. Since that point is related to the absolute temperature in the same way as is the peak of the intensity/wave length curve, it is evident that the positions of the bell crank, the nut 30 and the shaft 32 are all direct and accurate indications of the absolute temperature of the body from which the radiation is received.

To translate this indication of the source temperature into a convenient and easily read form, there is provided a scale comprising a pinion 48 fixed on shaft 32 and arranged to drive a gear 50 secured to a shaft 52 mounted for rotation in suitable bearings 54. Shaft 52 drives a dial-indicator pointer 56 past numbered divisions on a suitably calibrated temperature scale 58 mounted on the housing 14. Since energy of the entire spectrum received from the radiation source neglecting the amount lost in the optical system falls on the bolometer units, there is no lower visible wave length limit beyond which the instrument is ineffective as is true of two-color type pyrometers.

Hence, the instrument has a low temperature capability limited only by the transmissivity of lens 10 and prism 24. Nor is it necessary that the radiating object radiate visible radiation for reasons readily apparent to those skilled in this art. As will now be explained, the effective accurate range of the instrument includes substantially the entire temperature scale above the ambient temperature of the instrument situs.

Figure 5:
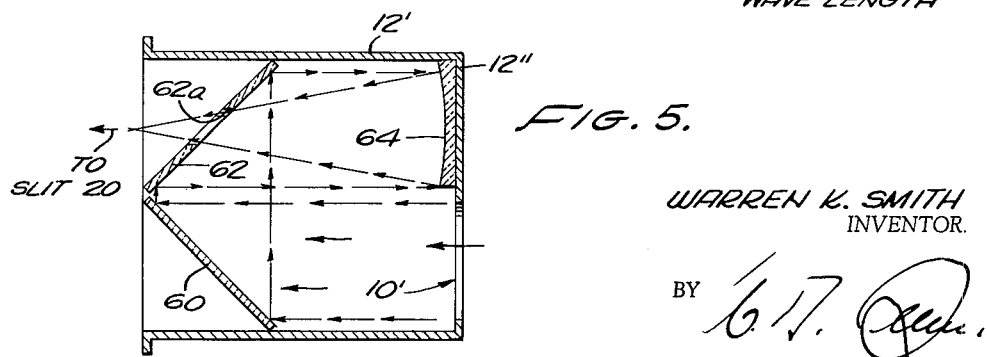
FIGURE 5 is a diagrammatic representation of an alternative form of the optical sub-assembly employed in FIGURE 1.

In those instances in which the absorption of energy by lens 10 is objectionable, as for example where relatively low temperatures are to be measured, barrel 12 and lens 10 may be removed from housing 14 and replaced by the auxiliary device shown in FIGURE 5. This auxiliary comprises a very-low-loss optical system mounted in a barrel 12' provided with a front cover 12" having an opening 10' through which radiation enters. This radiation is reflected by a front surface mirror 60 onto a second front surface mirror 62 and thence onto a concave front surface mirror 64. The converging beam of reflected radiation from mirror 64 passes through aperture 62a provided in mirror 62, and thence to slit 20 previously described. In other respects the system operates as previously described.

From the foregoing description it will be apparent that the described precision instrument measures temperatures with accuracy including temperatures very close to the ambient temperature at the instrument. The measurement of still lower temperatures is achieved by the use of a prism such as sodium chloride which transmits very long wave lengths, or in some cases by a low-loss diffraction grating in lieu of the quartz diffracting prism 24 and, if necessary, refrigerating bolometers 26 and 26'. Thus the system may be designed for effective and accurate measurement of very low temperatures, limited only by the ambient temperature and sensitivity of the detector units.

It is evident from the preceding description that, by suitably changing the bridge-circuit parameters, including values of resistors 40a, 40b, that the division of the intercepted radiant energy may be other than into portions each comprising half of the energy. Thus, for twin thermistor-bead bolometer units as sensors, resistors 40a, 40b may be of the order 10 K. ohms each in an exemplary circuit adapted for equal division of the energy. On the other hand it is quite feasible to utilize unequal resistors of values 8 K. and 12 K., ohms, respectively if a 40/60 division of the intercepted energy is desired.

Means are provided also for furnishing an electric potential proportional to the true temperature of the heat source for recording or like purposes. To this end, a potentiometer 70 is connected mechanically for rotational adjustment by shaft 52 (FIGURE 1). Potentiometer 70 is connected across any suitable source of potential, preferably a uniform D.C. source, and provides between one of its end terminals and the adjustable contact, a potential proportional to the true temperature of the radiating body and exhibited at terminals 70b and 70c from which it may be taken for control or recording purposes. This potential is also transferred to jack terminals 72 of an output jack 73 to energize a ratiometer, emittance meter or the like.

Suitable means furnishing a direct indication of the total radiant energy for the purpose of measuring emittance of the temperature source will now be described. Referring to FIGURE 2 it is pointed out that the input terminals of two isolation amplifiers 80 and 80' are connected in parallel with detectors 26, 26' between junctions L and O, and between O and M, respectively of bridge 40. Isolation amplifiers 80, 80' of any conventional construction have their outputs connected to respective output transformers 82, 82' the secondary windings of which are connected to drive current-summing amplifier 84. The output terminals of amplifier 84 are connected to total radiation terminals 72' of jack 73 (FIGURE 1).

It will also be understood that a total-radiation indicating meter 86 (FIGURE 2) may be connected to terminals 72' and is calibrated to furnish a direct visible indication of the total radiation. The connection for this meter may be effected by plugging into terminals 72', as is indicated by FIGURE 2.

Figure 3:
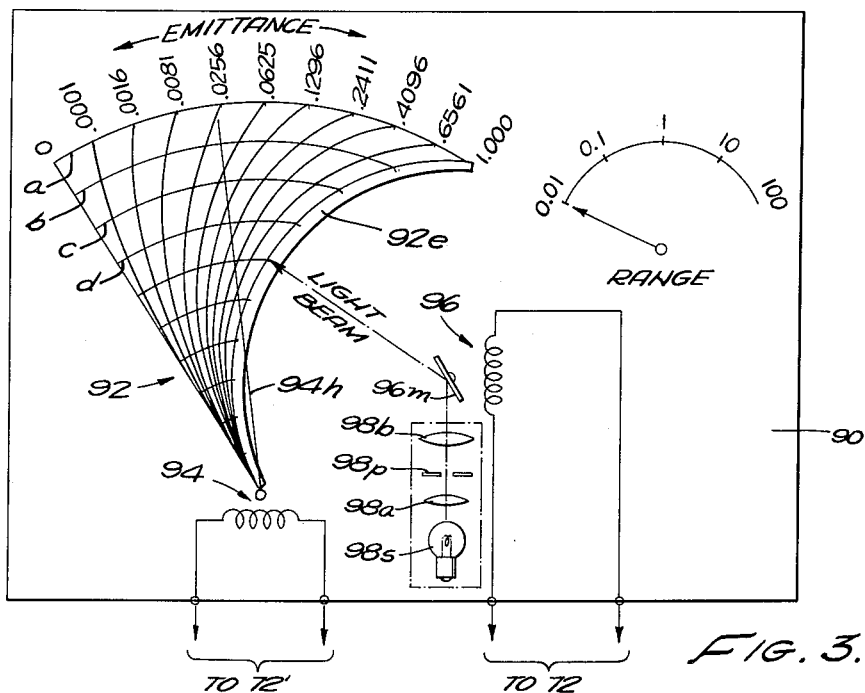
FIGURE 3 is a schematic illustrating the emittance meter of the invention.

As has been noted previously, emittance may, if desired, be computed using the true temperature indicated by the voltage measured at terminals 72 as the denominator and the apparent temperature measured at terminals 72' as the numerator in the well known emittance equation; $e = (T_1/T_2)^4$. However, according to this invention a direct indication of emittance may be provided by a ratiometer driven by the potentials exhibited at terminals 72 and 72' and constructed as illustrated in FIGURE 3. Mounted on a base or housing 90 is an etched transparent plastic dial 92. A millivoltmeter 94 has a hand 94h arranged to sweep over this dial. A second millivoltmeter or current galvanometer 96 is provided with a mirror 96m arranged in known manner to be deflected proportionally to the potential applied to its terminals. The mirror 96m reflects the beam of light supplied by an optical system 98 supported by the housing and which system includes a light source 98s, lenses 98a, 98b, and an aperture plate 98p. Millivoltmeter 94 is connected to the aforementioned terminals 72 to provide the denominator potential whereas meter 96 is connected to the terminals 72' to provide the numerator potential.

The described components are arranged so that the beam of light deflected by mirror 96m from system 98 falls onto the edge 92e of dial 92. The dial is preferably made from a thick sheet of methyl methacrylate or like transparent synthetic resin. A suitable material is marketed under the trade name "Lucite." Arcuate lines, such as those at a, b, c, d are etched in the surface of the dial using the pivot of pointer 94h as a center point. The light reflected from the galvanometer mirror 96m enters the edge of the light-transmitting material and passes along one of the etched lines, a, b, c, etc. By reason of refraction at the multiplicity of minute surfaces along the line, the line is illumined. Concurrently, hand 94h of meter 94 will be positioned with its point at one of the series of fractional numbers disposed along the uppermost arcuate line a. From each of that series of numbers there is inscribed on the dial a line terminating at the center of rotation of hand 94h, each such line passing through respective points on the lines b, c, d, etc., representing the quotient of the fourth powers of the temperature values represented by lines b, c, d, etc., and the corresponding indication lines of meter 94. It will therefore be recognized that each intersection represents a particular value of emittance and is read by tracing up along the curve commencing at the intersection of hand 94h and illumined curve b, c, or d, etc., to the indicated emittance values calibrated on curve a. If so desired, a large dial 92 can be provide so that each intersection of curves can be labeled with its respective emittance value, in which case the emittance can be read directly. A range selector 99 can be provided so that resistances can be added or removed from the input circuits in order to enable reading the emittance meter more easily in the wider spaced upper portion of the dial 92.

It is evident that the emittance may be computed using the temperature indicated by the voltage measured at terminals 72 as the denominator and that measured at terminals 72' as the numerator in the well-known emittance equation $e = (T_1/T_2)^4$. However, according to this invention a direct indication of emittance is provided, if desired, by including a commercially available ratiometer calibrated to the fourth power of the ratios and driven by potentials exhibited at terminals 72 and 72'. It will also be understood that the described spectropyrometer and emittance meters will be calibrated against a black body source to compensate for short-comings of the optical and other components in accordance with techniques well known to those skilled in this art.

The preceding explanation and description of the principles of the invention is set out with reference to a selected specific preferred exemplary embodiment illustrated in the drawings. In the light of that disclosure modifications and changes within the spirit and scope of the invention will occur to those skilled in the art, and accordingly I do not desire to limit the invention to the exact details of the exemplary embodiment or apparatus but only as the invention is defined by the appended claims.

I claim:

1. Thermometric apparatus comprising: first means, comprising means for intercepting and dispersing into a spectrum energy radiated by a body of unknown temperature; second means comprising twin radiant-energy sensors arranged to intercept the entire spectrum of radiant energy intercepted and dispersed by said first means; third means comprising balanceable bridge circuit means having arms each connected to receive the electrical output of respective ones of said sensors and providing an output means; fourth means comprising servosystem means connected to said output means and constructed and arranged to support and move said sensors to a position at which said radiant energy is divided between said sensors in a predetermined ratio defined by parameters of said third means; and temperature-indicating means indicative of the absolute temperature of said body including means connected to and moved to temperature-indicating position by said servosystem means, whereby the true absolute temperature of said body is indicated by said apparatus.

2. Apparatus according to claim 1 characterized in that said sensors each comprises a thermistor thermal detector having equal response to radiant energy of all wavelengths.

3. Apparatus according to claim 1 characterized in that said fourth means comprises a servomotor, and means movably supporting said sensors and connected for variable positioning by said servomotor.

4. A pyrometric system comprising: first means including means to intercept radiant energy emitted from a body of unknown temperature, and means to disperse the intercepted energy in a band according to wave length; second means comprising first and second twin radiant-energy detectors, constructed and arranged to position said detcetors to intercept substantially all of said dispersed band of energy with said first detector receiving energy of all shorter wave lengths and said second detector receiving energy of all longer wave lengths, said detectors when energized providing respective electrical outputs incident to interception of respective portions of said energy and said second means including means responsive to said outputs to cause movement of said detectors to a position equalizing the said electrical outputs; third means including means to energize said detectors; and fourth means comprising relatively movable indicator means connected to said second means and moved thereby incident to movement of said detectors to said position and constructed and arranged to indicate the absolute temperature of said body.

5. A pyrometer comprising: radiant-energy receiving and directing means; optical means including means for dispersing the received radiant energy into separable portions of differing wave lengths; twin radiant-energy sensor units disposed to intercept all the dispersed radiant energy and movable to positions effective to cause division of the dispersed radiant energy between the two sensor units according to a predetermined ratio; means for supporting and moving said sensor units including means connected to said units for control thereby to move said units in a sense to cause the said division of the dispersed radiant energy according to said ratio; and indicating means connected to be moved incident to movement of said sensor units to indicate the positions of the sensor units relative to a point of reference to thereby indicate the absolute temperature of the source of the received radiant energy.

6. A pyrometer according to claim 5 characterized in that said sensor units comprise matched thermal detector devices having equal response to radiant energy of all wavelengths.

7. A spectropyrometer comprising: optical means and radiant energy detecting means constructed and arranged to be relatively movable, said optical means being constructed and arranged to receive radiant energy from a source of unknown temperature and to disperse the received energy into a spectrum displayed on said detecting means, and said integrating means comprising first and second devices constructed and arranged to intercept all of the dispersed radiant energy; other means for producing relative motion between said optical means and said radiant energy detecting means to cause division of the dispersed radiant energy between said first and second devices in a predetermined ratio; and indicating means, comprising a reference means and an indicator movable relative to the reference means connected to be moved incident to relative movement between said optical means and said radiant-energy detecting means for indicating the extent of the relative movement which is a measure of the absolute temperature of the source.

8. A method of providing an indication of the absolute temperature of a body comprising: intercepting radiant energy radiated from the body; dispersing the intercepted radiant energy into a spectrum with the longer wave lengths portion of the energy at one extreme of the spectrum and with the shorter wave lengths portion of the energy at the other extreme of the spectrum; intercepting and measuring longer wave lengths portion of the spectrum, while concurrently similarly and separately intercepting and measuring the total energy of the remainder of the spectrum to provide indications of the relative amounts of intercepted proportion of energy; and varying the interception of energy between the two portions to bring to a predetermined ratio the amounts of energy separately intercepted by decreasing or increasing the shorter wave length limit of longer wave lengths energy intercepted in said longer wave lengths portion and concurrently decreasing or increasing the longer wavelength limit of shorter wavelengths energy intercepted in said shorter wavelengths portion, thereby to indicate the wave length dividing the longer wave lengths portion of energy from the remainder according to a predetermined ratio, whereby to provide an indication of the absolute temperature of the body.

9. A pyrometer comprising: first means comprising means for receiving a beam of radiant energy from a body under investigation; second means comprising optical means constructed and arranged to receive the beam of radiant energy and to disperse the beam into a spectrum comprising first and second portions the first portion consisting of the longer-wave lengths of the radiant energy and the second portion comprising the remainder of the wave lengths; third means comprising first and second twin radiant-energy detecting means disposed for interception of the entire spectrum of radiant-energy and for reception of the first portion by the first detecting means and the remainder by the second detecting means; fourth means comprising means for causing shift of twin detecting means whereby to divide all of the intercepted energy between the two detecting means according to a predetermined ratio, said fourth means by its position automatically assumed in the spectrum indicating the wave length at which division of wave lengths between said remainder and said portion of longer wave lengths occurs, whereby said indication of wave length division by natural law provides an indication of the absolute temperature of said body.

10. Pyrometric apparatus comprising: first means comprising optical means for intercepting radiant energy emitted from a body whose temperature is of interest and including means for dispersing the intercepted energy into a spectrum of wave lengths of energy; second means comprising relatively movable first and second indicator means constructed and arranged to indicate absolute temperature; third means comprising first and second radiant-energy detecting devices constructed and arranged relative to said first means to cause interception of said spectrum by said energy detecting devices and with division therebetween of said spectrum such that the energy of wave lengths of longer value are intercepted by the first energy detecting device and the remainder by the second detecting device; and fourth means including power means constructed and arranged to vary the position said detecting devices relative to said spectrum thereby to vary the division of said spectrum between said first and second energy detecting devices until a certain ratio therebetween is attained, while concurrently varying said indicator means, one relative to the other thereby to provide an indication of the wave length at which the division of energy between said energy detecting devices occurs and concurrently provide an indication of the absolute temperature of the said body.

11. Apparatus according to claim 10 characterized in that said first and second energy detecting devices are matched bolometer units each comprising a thermistor thermal detector having equal response to all wavelengths of intercepted radiant energy.

12. Apparatus according to claim 11 characterized in that said fourth means comprises electrical bridge circuit means having opposed arms each comprising the resistance of a respective one of said thermal detectors, and servo-control means responsive to conditions in said bridge-circuit means and operable to effect relative movement of said indicator means concurrently with relative varying of said thermal detectors with respect to said optical means.

13. Apparatus according to claim 12 characterized in that said fourth means comprises also means for summing energy indications of said energy integrating devices.

14. Pyrometric apparatus comprising: first means to receive and disperse radiant energy from an emissive body into a spectral distribution of the energy; second means comprising two thermistor matched thermal detector devices constructed and arranged to intercept all of the dispersed radiant energy with a first of said devices intercepting the longer wave lengths thereof and the second of said devices intercepting the shorter wave lengths thereof; third means including movable means responsive to the outputs of said thermal detector devices and effective to move to cause distribution of the dispersed radiant energy among said devices in accord with a predetermined ratio; and fourth means comprising indicator means moved by said movable means to indicate the movement of the movable means whereby said indicator means indicates the true Kelvin temperature of the said emissive body.

15. Pyrometric apparatus as defined in claim 14 characterized in that said third means including said movable means are effective to divide the dispersed energy equally among said matched thermal detector devices.

16. Pyrometric apparatus as defined in claim 15 characterized in the provision of means connected to said third means and effective to indicate the emittance of the emissive body.

17. Pyrometric apparatus as defined in claim 16 characterized in that said matched thermal detector devices are mounted on said movable means.

18. Pyrometric apparatus for indicating the true Kelvin temperature of an emissive body comprising: first means comprising fixed mirror means and optical means including means for intercepting radiant energy from said body and directing the intercepted radiant energy onto said mirror means and including means for intercepting and dispersing the radiant energy reflected by said mirror means into a spectral dispersion; second means comprising first and second matched thermal detector bolometer devices having respective output lines, said second means and said first means being constructed and arranged for interception by said bolometer devices of the dispersed radiant energy reflected by said mirror with interception of the longer wave lengths by one of said bolometer devices and the shorter wave lengths by the other of said bolometer devices, said first and second means comprising movable means for causing relative shifting of the bolometer devices with respect to dispersed radiant energy and whereby all of the spectral dispersion is intercepted by said bolometer devices and the energy in said spectral dispersion is divided among said devices according to a predetermined ratio, said second means comprising means connected to said devices and responsive to the outputs thereof for actuating said movable means and further comprising calibrated indicator means operable in response to movement of said movable means to indicate the true Kelvin temperature of the emissive body.

19. Pyrometric apparatus as defined in claim 18 including means connected to sense the respective outputs of said bolometer devices and effective in response thereto to indicate the emittance of the emissive body.

20. Apparatus for providing an indication of the true absolute temperature of a body comprising: first means comprising optical means constructed and arranged to receive radiant energy from the said body and to diffract the energy into a spectrum; second means comprising twin radiant-energy sensors disposed to intercept and respond to respective portions of the radiant energy of said spectrum; third means comprising movable support means constructed to support and to move said sensors; fourth means comprising means responsive to the outputs of said sensors and effective to move said support means to a position in which the sensor outputs bear a predetermined relationship each to the other, and indicator means connected to said movable support means to be moved thereby to indicate the absolute temperature of said body.

21. Apparatus as defined in claim 20 characterized in that said twin radiant-energy sensors are two bolometer devices of the thermistor type.

22. Apparatus as defined in claim 21 characterized in that each of said bolometer devices comprises a thermistor of the bead type and each thermistor is affixed to a respective one of like small pieces of foil.

23. Apparatus for providing an indication of the true absolute temperature of a body comprising: first and second thermistor devices; means constructed and arranged to receive direct radiation from the body and to disperse the received radiation into a spectrum and to direct the dispersed radiation onto the said thermistor devices, and including movable means for changing the relative positions of said spectrum and of said devices to divide the radiant energy incident on said devices in a predetermined ratio, and means including indicator means operable by said movable means for indicating the relationship between said relative positions and for thereby indicating the true absolute temperature of said body.

24. Apparatus as defied in claim 23 including means effective to indicate the emittance of said body.

25. Apparatus for providing a direct indication of the emittance of a thermally radiating body comprising: first means comprising mechanical and optical means for intercepting radiant energy radiated by the said body and for causing a spectral dispersion of the intercepted radiant energy; second means comprising first and second matched bead thermistor bolometer devices having respective outputs, and means for supporting and moving said devices in together to a position to intercept the said spectral dispersion with equal radiant energy distribution between said devices; third means comprising means connected to said devices and responsive to the said outputs thereof for producing a first output proportional to the true absolute temperature of said body and a second output proportional to the sum of the outputs of said devices; and fourth means comprising output responsive means connected to said third means and effective to indicate the fourth power of the quotient of the ratio of said second output to said first output thereby to provide a direct indication of the emittance of said body.

26. Apparatus as defined in claim 25 characterized in that said third means includes means effective to indicate directly the true absolute temperature of said body.

27. The method of obtaining a direct reading of the emittance of a heat source without physical contact therewith comprising obtaining a first potential from a radiation sensor proportional to the apparent temperature of the heat source, obtaining a second potential from said radiation sensor proportional to the true temperature of said heat source, and producing an intelligible readout activated by said first and second potentials and representing the fourth power of the quotient of said apparent temperature acting as numerator and of said true temperature acting as the denominator.

28. Pyrometric apparatus comprising: first means comprising optical means for intercepting radiant energy emitted from a body whose temperature is of interest and including means for dispersing the intercepted energy into a spectrum of wave lengths of energy; second means comprising first and second total radiant energy sensors mounted adjacent and together on movable means and arranged relative to said first means to cause interception of said spectrum by said sensors and with division therebetween of said spectrum such that all of the energy of wavelengths of longer value are intercepted by the first energy sensor device and the remainder by the second sensor device; third means comprising power means constructed and arranged to vary position of said second means such that each of said sensors receives a predetermined fraction of the radiant energy in said spectrum, and fourth means comprising indicator means attached to said movable second means to indicate relative position thereof in said spectrum at balance, the position thereby constituting an indication of the wavelength dividing the energy of the spectrum between the two sensors of second means according to the desired ratio, and by natural law thereby also indicating absolute temperature of the body of interest.

References Cited by the Examiner
UNITED STATES PATENTS

| 2,166,824 | 7/1939 | Runaldue | 88—22.5 X |
| 2,175,681 | 10/1939 | Brunner. | |
| 2,933,974 | 4/1960 | Broerman | 88—14 |

References Cited by the Applicant
UNITED STATES PATENTS

| 2,218,253 | 10/1940 | Weaver. |
| 2,927,502 | 3/1960 | Watrous. |
| 2,972,282 | 2/1961 | Fosterling et al. |

FOREIGN PATENTS

| 405,205 | 11/1909 | France. |
| 656,151 | 1/1938 | Germany. |
| 947,753 | 8/1956 | Germany. |
| 508,802 | 7/1939 | Great Britain. |
| 286,544 | 2/1953 | Switzerland. |

ISAAC LISANN, *Primary Examiner.*

J. H. PEDENES, *Examiner.*

UNITED STATES PATENT OFFICE
CERTIFICATE OF CORRECTION

Patent No. 3,222,930　　　　　　　　　　　　　　December 14, 1965

Warren K. Smith

It is hereby certified that error appears in the above numbered patent requiring correction and that the said Letters Patent should read as corrected below.

Column 8, line 36, and column 10, lines 29 and 47, strike out "thermistor", each occurrence; column 11, line 72, strike out "in".

Signed and sealed this 7th day of February 1967.

(SEAL)
Attest:

ERNEST W. SWIDER　　　　　　　　　　　　　　　EDWARD J. BRENNER
Attesting Officer　　　　　　　　　　　　　　　Commissioner of Patents